Feb. 2, 1965 R. SONDERMEYER 3,168,618

APPARATUS FOR RECORDING SIGNALS AND FOR REPRODUCING SIGNALS RECORDED ON A MAGNETIZABLE TAPE

Filed Aug. 28, 1961 2 Sheets-Sheet 1

Jnventor:
Richard Sondermeyer
by
Michael S. Striker
Attorney

Jnventor:
Richard Sondermeyer
by
Michael S. Striker
Attorney

United States Patent Office 3,168,618

Patented Feb. 2, 1965

3,168,618

APPARATUS FOR RECORDING SIGNALS AND FOR REPRODUCING SIGNALS RECORDED ON A MAGNETIZABLE TAPE

Richard Sondermeyer, Darmstadt, Germany, assignor to Fernseh G.m.b.H-Darmstadt, Darmstadt, Germany Filed Aug. 28, 1961, Ser. No. 134,424

Claims priority, application Germany, Aug. 30, 1960, F 31,998

17 Claims. (Cl. 178—6.6)

Figure 1:
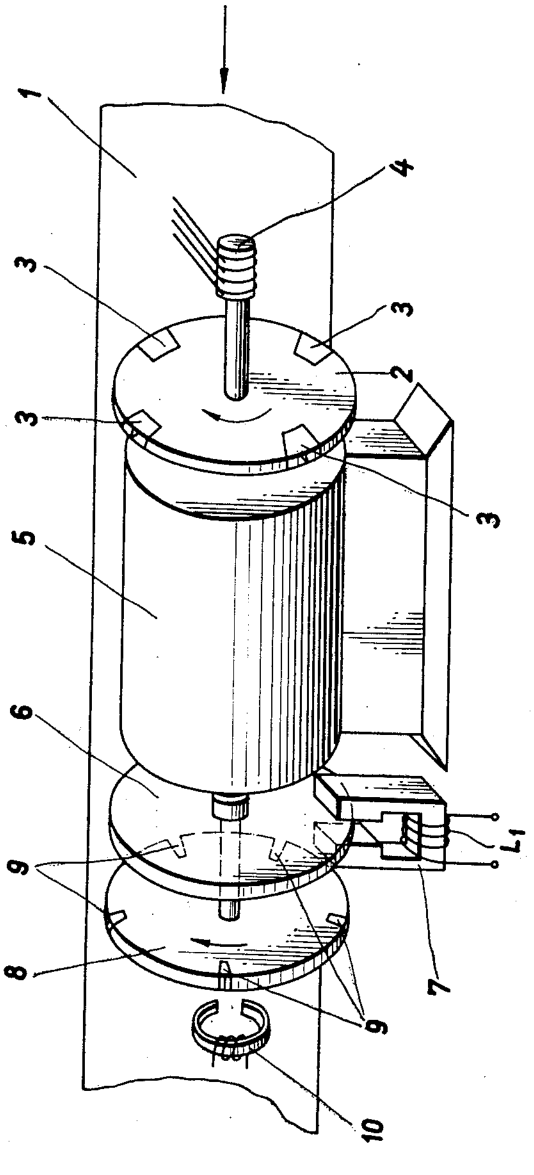

This invention, which is concerned generally with the recording of signals upon magnetic tape and with the recovery of signals so recorded, is of particular importance in modern television technique for the recording of video signals upon magnetic tape and for reproducing video signals previously recorded upon magnetic tape. For this purpose the signals to be recorded are applied to a magnetic transducer head carried upon the circumference of a revoluble member rotating at a high speed, past, and in contact with, which is led the magnetic tape. This tape consists of a broad tape of synthetic plastic material coated with a magnetic material in finely powdered form and secured by an appropriate adhesive. In order to meet above condition, the tape is usually cylindrically curved by an appropriate guide into a concave shape so that the cylindrical member carrying the magnetic transducer head or heads is in full engagement with the transversely curved adjacent surface of the tape during the process of recording or reproduction of the video signals while the tape moves in longitudinal direction thereof.

It is required, especially in the recording of television signals, that the rate of the relative movement between the magnetic head and the tape shall remain constant within close limits. In a known system of this kind for recording television signals a head drum, which carries four equally spaced magnetic transducer heads, rotates at a speed of 15,000 r.p.m. (CCIR-standard) or 14,400 r.p.m. (American standard). At each quarter-revolution of the head drum one of the magnetic transducer heads "writes" 15 to 17 lines on the tape, that is, about 61,000 picture points per revolution for the European standard of 625 lines and about 57,000 picture points for the American standard of 252 lines. It is desired to keep fluctuations, due to disturbances of all kinds, in the relative movement between transducer heads and tape as small as possible, so that any disturbances are not visible in the reproduced television picture. For this purpose it is necessary to keep lateral jitter of the television picture to less than one picture point. Since the head drum runs with its circumferential movement approximately perpendicular to the direction of movement of a tape which is closely restrained by a longitudinal guide, it is thus desired that during the drum rotation the greatest deviation of any angular position of a point of the head drum from its correct angular position, for considering the rotary movement an absolutely uniform one, shall be smaller than 10.6 seconds of an arc, which is equivalent to one-half of a picture point at the CCIR standard.

It has been found in many years of practical operation, in numerous countries, of magnetic recording equipment of this kind for the recording and reproduction of television signals, that this requirement for very high accuracy cannot be fulfilled with known means, although much research has been done on different methods, sometimes at very high cost.

It is therefore a main object of this invention to provide for an apparatus of the type set forth, having the characteristics of the required high accuracy.

It is a further object of this invention to provide for an apparatus as mentioned above, which is comparatively simple in structure and entirely reliable in operation.

The present invention is based on the experimentally obtained knowledge, that extraordinarily high uniformity of movement of the head drum can be obtained if a synchronous motor is fed with alternating current of relatively high frequency, amounting for example to 240 or 250 c.p.s., and if special means are provided for starting this motor.

According to the present invention there is provided apparatus for recording electrical signals upon as well as for reproducing previously recorded signals from a magnetic tape by means of a revoluble member carrying one or more magnetic transducer heads which engage said tape, comprising a synchronous electric motor having two or more salient poles arranged to rotate said revoluble member, an impulse generator the natural frequency of which is arranged to be continuously variable between an initial, low value such that said motor will commence to run when supplied with currents of that low frequency, and a final high value such that said motor when supplied with currents of that high frequency will run at a speed in the neighborhood of its rated speed, means for supplying to said motor currents the frequency of which is equal to that of said impulse generator, and synchronizing means arranged to become operative after the frequency of said generator has substantially reached said final speed value, and causing said generator then to operate at a predetermined constant frequency such that said motor will thereafter run at its rated speed.

It is also advantageous for the apparatus to comprise means for comparing the phases of a first signal derived from the rotation of the motor shaft and a second, reference signal supplied, for example, by a master impulse generator and for deriving as a result of this phase comparison a control voltage which is applied to vary the phase of the currents fed to said motor in such a sense as to reduce the difference in phase between said compared signals.

To avoid disturbances due to hunting, it is advantageous to provide means whereby said control voltage is allowed to become operative only when the motor is running at its rated speed.

To control the instaneous angular positions of the motor during the reproduction of the recorded signals a train of signals may be derived from the tape and compared in phase with a train of reference signals, the control voltage derived from such phase comparison being, as mentioned above, used to vary the motor phase so as to reduce the phase difference between the phase-compared signals. It is especially advantageous to arrange for the phase-comparison circuit to become operative only upon coincidence of two vertical-frequency synchronizing signals derived respectively from the tape and from a master impulse generator, the phase comparison circuit when operative being arranged to compare horizontal-frequency synchronizing signals supplied by the master impulse generator with horizontal synchronizing signals taken from the tape and to supply a control voltage which operates to reduce the phase difference between the compared signals by influencing the current fed to the motor.

Figure 2:
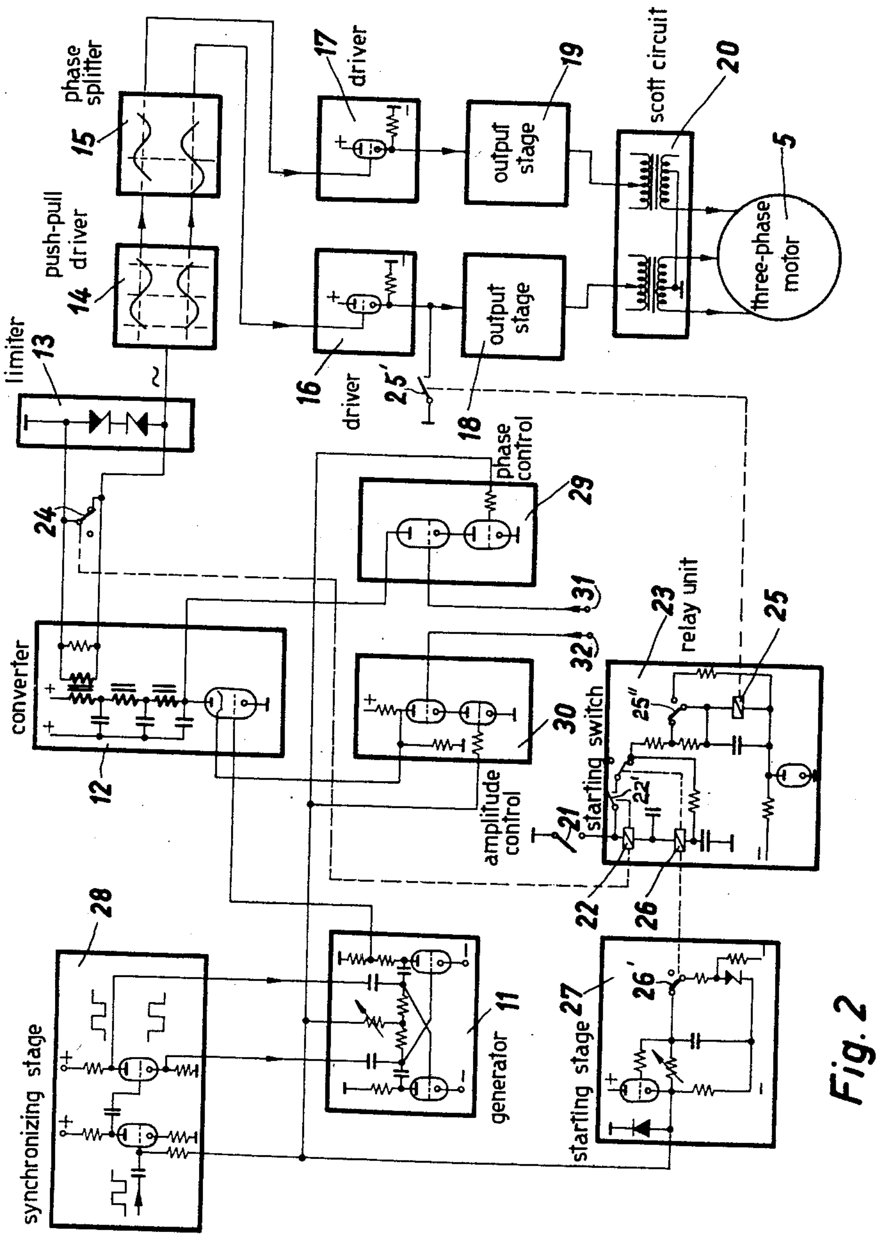

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGURE 1 is a perspective view illustration in simplified diagrammatic form of a driving motor together with its head drum and eddy-current brake, and FIGURE 2 is a circuit diagram in block form of one embodiment of apparatus according to the invention.

In both these drawings corresponding elements are designated by the same reference numerals.

FIGURE 1 illustrates an embodiment of a head-drum drive which may be used both for the recording of television signals upon a magnetic tape and also for the reproduction of previously recorded signals from a magnetic tape. This is a simplified illustration from which all elements not essential to the understanding of the invention have been omitted.

The tape 1, provided with a ferromagnetic layer in which the television signals are stored as a pattern of differently polarized areas, is moved by means of a conventional drive arrangement (not shown) at a speed which will usually be some 38 cm./second in the direction of the arrow past, and in contact with, the circumference of a head drum 2. For this purpose the tape is curved transversely to form a cylindrical surface in the region of the head drum and matching the cylindrical surface of the latter, by means of a suitable guide arrangement which is not illustrated. The head drum 2 is driven to rotate at about 15,000 r.p.m.; it carries four magnetic transducer heads 3, which are uniformly spaced about its periphery These transducer heads 3 have each an air-gap of the order of magnitude of $1\mu$. During recording, currents corresponding to the television signals to be recorded are applied to the magnetic transducer heads by way of slip rings and brushes indicated at 4. If it be assumed that the television signal is of the CCIR standard of 625 lines, then each transducer head "writes" some 16 lines on a transverse track which is approximately, though not exactly, perpendicular to the direction of advance of the tape. Before one head has finished its recording the following head commences with the recording of the next magnetic "line," which is somewhat displaced longitudinally of the tape, from, though parallel with, the preceding "line." The head drum 2 is driven by a synchronous motor 5, the stator winding of which is, as explained below, fed from a special generator, and the rotor of which is provided with copper anti-hunting bars.

To the motor shaft is secured an aluminium disc 6, which rotates between the pole-pieces of a ferromagnetic yoke 7 in which a magnetic flux may be produced by current passed through a coil $L_1$. The system operates as an eddy-current brake and serves the purpose of controlling the instantaneous angular positions of the head drum 2, or the angle of lag of the motor when running.

Also on the motor shaft is secured a disc 8 of non-magnetic material, on the circumference of which there are placed at equal distances five blocks 9 of iron or of a magnetized material. These blocks 9 cooperate with a magnetic transducer head 10 in which there is thus generated a train of electric signals characteristic of the instantaneous angular position of the rotor of the motor 5 and thus also of the angle of lag. This magnetic measuring device is necessary in order to keep the angle of lag to a predetermined value during the recording of television signals on the magnetic tape. This angle of lag must be independent of the fluctuations in load which result from the magnetic transducer heads 3 of the head drum 2 sliding with a possibly irregularly varying rubbing friction against the magnetic tape which is being drawn past them. The problem which arises here is to maintain constant (to within about 5 picture points, that is, to within 100 seconds of arc, during recording, and during reproduction to within one-half of a picture point, that is, to within 10.5 seconds of arc), the deviation between the actual angular position of the head drum and its correct position which it would occupy if rotated at exactly its rated speed. It is important that these tolerances are not exceeded even during such a short time as one-half of a second.

The shaft of the head-drum motor may be provided with a second disc of non-magnetic material (not shown) carrying at its circumference one iron or magnetized block, and a magnetic transducer head may then be used to derived from this second disc controlling signals.

Alternatively, instead of a reference signal being derived magnetically, the disc 6 mounted on the motor shaft may in known manner be provided with alternate fields of high and of low reflectance (they may be white and black) from which varying amounts of light from a suitably disposed source are reflected into a photocell to produce electrical signals characteristic of the instantaneous angular position of the rotor. The arrangements necessary for this purpose are well-known in the art and it is not thought necessary to illustrate them.

Practical tests have shown that the problem of starting the motor and of controlling the angular positions of the motor are satisfactorily solved by the apparatus here described.

In FIGURE 2 there is shown the block circuit diagram of a circuit arrangement suitable for use in apparatus according to the invention for controlling the starting and synchronization of the head drum motor 5. The circuit arrangements within each individual unit are indicated only insofar as they are necessary to an understanding of the invention.

When the equipment is set in operation the conventional generator 11 oscillates at a frequency of some 40 to 50 c.p.s., depending upon the bias voltage appearing at this time upon the grids of its tubes and without at first becoming synchronized. The voltage appearing at the output of generator 11 is fed by way of a converter stage 12, which effects its conversion into a voltage of sinusoidal form, to a conventional limiter circuit 13 which prevents the voltage from exceeding a predetermined maximum value during the starting process. The purpose of this amplitude limiting step is to avoid the sinusoidal voltage losing its sinusoidal character and becoming a voltage rather of pulse form in the final stages, especially in the final amplifier, owing to overdriving the valves into the non-linear region of their characteristics, and the motor thus being fed with a voltage of waveform differing greatly from the sinusoidal. The limited sinusodal voltage passes by way of a conventional driver stage 14 with push-pull output into a conventional wide-band phase-splitter 15, at the two outputs of which appear voltages electrically shifted by $+45°$ and $-45°$, respectively, with respect to the input voltage and thus differing in phase by 90°. Each of these two output voltages is now applied to one of two conventional driver stages 16 and 17, each of which includes a cathode-follower connected in the signal path for impedance matching to the subsequent final amplifier. The outputs from driver stages 16 and 17 are applied respectively to conventional drive output amplifier stages 18 and 19. After amplification, the two sinusoidal voltages, which in fact form a two-phase supply, are converted in a conventional Scott transformer circuit 20 into a three-phase supply, the component phases of which are mutually displaced by 120°. The three-phase supply thus obtained feeds the three-phase head drum drive motor 5.

When the equipment is in a state of readiness, closing the starting switch 21 completes the operating circuit for a relay 22, which is included in a relay unit 23. The second contact 24 of relay 22, which when the relay is in its unoperated condition short-circuits the output of converter stage 12, now removes this short-circuit and allows the sinusoidal voltage from converter stage 12 to pass through the subsequent stages to energize the head drum drive motor 5.

Relays 25 and 26 are also energized when starting switch 21 is closed. The circuit for relay 25 includes the first contact 22′ of relay 22 and contact 25″ of relay 25. Relay 25 has its contact 25″ connected in series with its operating coil, so that this relay rapidly switches itself on and off. The external contact 25′ of relay 25 makes and breaks a short-circuit on one phase of the two-phase supply from which the three-phase supply for motor 5 is derived. This operation sets the rotor of the motor into oscillation and thus by overcoming the initial bearing friction ensures positive starting.

The contact 26′ of relay 26 switches on a starting stage 27. The current in this stage is initially zero, for the tube is cut off by a negative bias applied through the relay contact 26′. When the relay contact 26′ is moved to open position the negative bias on the tube is removed and as a capacitor in its grid circuit charges through an adjustable resistor the valve commences to pass current so that the output voltage of this stage, which is represented by the potential at the cathode of the tube, rises. The output voltage of stage 27, applied to the generator 11 and to the synchronizing stage 28, is initially equal to the negative supply voltage, but when the relay contact 26′ opens the tube commences to pass current so that the voltage at its cathode rises progressively, during a time which may be adjusted to a value between one and four seconds. The result of this is that the natural frequency of the generator 11, which initially amounts to some 40 to 45 c./s., rises without synchronization to a value of some 240 to 245 c./s., which may be set by adjustment of a variable common part by the grid leak resistance.

As the grid bias applied to the tubes of the generator stage 11 rises, so also does the grid bias voltage of a switching tube in the synchronizing stage 28 rise towards more positive values as the first tube in the synchronizing stage 28 passes current. When owing to the increased grid bias voltage applied to its tubes the generator 11 reaches a frequency of about 230 c.p.s., then the grid bias voltage on the switching tube of the synchronizer stage 28 has risen sufficiently for the tube to become operative. To the grid of this valve is applied a 250 c.p.s. square-wave voltage originating in a master impulse generator for the system (not shown). When the switching tube in synchronizing stage 28 becomes operative the 250 c.p.s. voltage is fed to a phase-splitter tube from which appropriately phased signals are fed to the two tubes of generator 11 which is thus synchronized at 250 c.p.s., at which frequency it then continues to operate. Generator 11 now operates merely as an amplifier for the 250 c.p.s. square-wave voltage, which is fed through it to converter stage 12, in which it is converted into a sinusoidal voltage in exactly the same manner as the voltage produced at the start by the generator when this was self-oscillatory.

The converter stage 12 may comprise a tetrode or pentode tube, to the control grid of which the square-wave voltage is applied and in the anode circuit of which there is connected a filter circuit in the form of a low-pass filter consisting of two pi-sections, connected in series, and a transformer the primary winding of which is connected in series with the filter chokes. The sinusoidal voltage taken from the secondary winding of the transformer passes through the limiter circuit 13. At its now high frequency of 250 c.p.s., that is at its regular operating frequency, no amplitude limiting takes place. Amplitude limiting is necessary at the lower frequencies which occur during the starting process, since the output of the filter circuit of 12 is frequency-dependent so that during the starting period the amplitude of the output signal from the converter 12 is excessive. This could lead to appreciable over-driving of the final amplifier. At the normal operating frequency, however, such limiting is unnecessary, and is in fact undesirable, since otherwise the waveform of the voltage applied to the motor and thus the power fed to it could alter too greatly and to an uncontrollable extent.

In the converter stage 12 the phase and the amplitude of the sinusoidal voltage appearing on the secondary winding of the transformer may each be influenced by an individual control voltage. One of these control voltages is provided by a frequency- or phase-control stage 29 and the other by an amplitude control stage 30. The operation of the two control stages is controlled by direct voltages supplied to the terminals 31 and 32 respectively by a servo system (not shown) responsive to the angular position of the motor. The direct voltage of 10 to 20 volts supplied to terminal 31 serves for coarse control, and the differentiated value of ±5 v. D.C. applied to terminal 32 is used on the other hand for fine control. The essential elements of the control stages 29 and 30 are double triode valves, the sections of which are connected in series. To the grid of the lower section in each stage is applied a voltage dependent upon the rise of current in the starting stage 27, which allows these control stages to become operative through the passage of current only when synchronization of the generator 11 has taken place, in other words, after the motor is running at its full speed determined by the application to it of a supply at a frequency of 250 c.p.s. It is thus arranged that indeterminate alterations of the control voltage which may appear during the starting process cannot interfere with the conversion of the square-wave voltage into a sinusoidal signal. The control voltage for coarse control is applied from terminal 31 to the grid of the upper section of the double triode of stage 29, which draws its anode current from the junction point between the anode of the driver tube of converter stage 12 and the filter circuit. In accordance with the magnitude of the control voltage there is thus produced a phase shift of up to ±35° in the square-wave-like voltage appearing at the anode of the driver tube of converter stage 12 for conversion into a sinusoidal voltage. The control voltage for fine control applied to terminal 32 correspondingly alters the voltage on the grid of the upper section of the double triode tube in stage 30, the anode of which is connected to the tapping on a voltage divider from which is supplied the screen grid of the driver tube in stage 12. The magnitude of the control voltage applied to stage 30 from terminal 32 thus controls the amplitude of the sinusoidal voltage at the output of converter stage 12. This in turn results in an alteration in the power supplied to the motor and thus to a corresponding alteration in the angle of lag and a change of up to ±10° in the angular position of the motor shaft. The two control systems, that for coarse and that for fine control, operate completely independently of one another and without any reaction exerted by one upon the other.

The sinusoidal voltage from converter stage 12, thus controlled in phase and amplitude, now passes on to supply the motor in exactly the same manner as described above, with the exception, already noted, that no limiting action is now effected in limiter stage 13. The sinusoidal voltage, finally converted into a three-phase voltage, now controls the angular position of the rotor of motor 5, which is running at exactly the speed prescribed by the output frequency of the synchronized generator 11.

To control the eddy-current brake during the magnetic recording of signals a signal train is derived from the rotation of the motor shaft in a well known manner by the elements 8, 9 and 10, while during the reproduction of previously recorded signals a signal train is derived by conventional means not shown from the synchronizing components of the signal (the composite television signal) recovered by means of the magnetic transducer heads 3 of the head drum 2 from the magnetic tape, which contains only the unrestored horizontal synchronizing signals. The phase of pulses of one or the other of these signal trains are compared by conventional means not shown with a reference signal derived from horizontal synchronizing signals or with the horizontal synchronizing signals themselves taken from the master impulse generator which controls the operation of the television studio or of the transmitted program, by conventional means not shown. From the comparison of the two signals there is derived a control voltage which is used both directly and in the form of an auxiliary control voltage which is derived from the initial control voltage by differentiation. The auxiliary control voltage is additively combined with the initial control voltage and the combined control voltage is applied to the grid of a cathode-follower tube in the cathode circuit of which is connected the exciting coil $L_1$ for the eddy current brake 6.

The aluminium disc 6 of the eddy-current brake is rigidly locked to the shaft of the head drum drive motor 5. The shaft of this motor is thus restrained or released to a greater or lesser extent by the mechanical forces produced by the controlled eddy-current brake. With correct control arrangements and an appropriate sense of the braking torque, hunting of the head drum motor shaft is considerably reduced, so that in the television pictures reproduced on domestic television receivers fed with the reproduced signal there appear only small lateral fluctuations which are not sufficient to be disturbing.

It will be understood that each of the elements described above, or two or more together, may also find a useful application in other types of apparatus for recording signals, and for reproducing signals recorded, on a magnetizable tape differing from the types described above.

While the invention has been illustrated and described as embodied in apparatus for recording signals, and for reproducing signals recorded, on a magnetizable tape by means of the devices shown and described, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus of the type set forth, in combination, a rotatable member; motor means for rotating said rotatable member at a predetermined speed when an alternating voltage of predetermined frequency is applied to said motor means, said motor means requiring for starting an alternating voltage supply at a frequency substantially lower than said predetermined frequency; current supplying means having a voltage output at a frequency steplessly variable at least between said starting frequency and said predetermined frequency; synchronizing means for maintaining said output voltage of said current supplying means at said predetermined frequency when operatively connected to said current supplying means; means for raising the frequency of said output voltage of said current supplying means steplessly from said starting frequency to at least said predetermined frequency; and means for operatively connecting said synchronizing means with said current supplying means automatically substantially when the output voltage thereof reaches said predetermined frequency, so as to maintain thereafter said output voltage constantly at said predetermined frequency and thereby maintain also said predetermined speed of said motor means constant.

2. In an apparatus of the type set forth, in combination, a rotatable member; at least one electromagnetic transducer head carried by said rotatable member for being moved along a circular path and adapted to record signals on a magnetizable tape and to pick up recorded signals from such tape while the latter is moved transversely of said circular path and past said transducer head; motor means for driving said rotatable member at predetermined speed depending upon a predetermined frequency of an alternating voltage applied to said motor means, said motor means requiring for starting a supply of alternating voltage at a starting frequency substantially lower than said predetermined frequency; pulse generator means having a natural frequency steplessly variable between said starting frequency and said predetermined frequency, by application of a control voltage; circuit means for applying the output of said pulse generator means to said motor means; synchronizing means connected to an outside source of electric pulses having said predetermined frequency, and changeable between non-operative condition and operative condition by application of said control voltage, said synchronizing means, when operative, causing said natural frequency of said pulse generator means to be constantly equal to said predetermined frequency; and control means for furnishing said control voltage of said pulse generator means for raising said natural frequency thereof from said starting frequency toward said predetermined frequency, and for furnishing said control voltage also to said synchronizing means for rendering the latter operative when said natural frequency of said pulse generator means reaches said predetermined frequency.

3. An arrangement as claimed in claim 2, including means cooperating with said rotatable member for deriving from its rotation a train of comparison signals the frequency and phase whereof is representative of the instantaneous rotary speed and angular position of the rotor of said motor means, means for comparing the phase of said comparison signals with the phase of reference signals of known frequency and phase and available from an outside source, and for furnishing a second control voltage representative of any existing phase difference between said signals, respectively, and phase control means for influencing, by means of said second control voltage, the phasing of the energy supply of said motor means in such a manner that said phase difference is decreased.

4. An arrangement as claimed in claim 2, including means cooperating with said transducer head for deriving from signals picked up from recorded signals on said tape a train of comparison signals, means for comparing the phase of said comparison signals with the phase of reference signals of known frequency and phase and available from an outside source, and for furnishing a second control voltage representative of any existing phase difference between said signals, respectively, and phase control means for influencing, by means of said second control voltage, the phasing of the energy supply of said motor means in such a manner that said phase difference is decreased.

5. An arrangement according to claim 4, comprising means for separating from television signals recorded on said tape horizontal synchronizing signals contained therein and for using the same as comparison signals, means for comparing the phase of said comparison signals with the phase of horizontal synchronizing signals available from an outside master impulse generator and serving as reference signals, and furnishing a second control voltage representative of any existing phase difference between said signals, respectively, and phase control means for influencing, by means of said second control voltage, the phasing of the energy supply of said motor means in such a manner that said phase difference is decreased.

6. An arrangement according to claim 3, including means for differentiating said second control voltage, and means for influencing, by means of said second control voltage, the amplitude of voltages supplied to said motor means.

7. An arrangement according to claim 4, including means for differentiating said second control voltage, and means for influencing, by means of said second control voltage, the amplitude of voltages supplied to said motor means.

8. An arrangement according to claim 3, wherein said phase control means include eddy-current brake means operatively connected to the rotor of said motor means and responsive to said second control voltage for decreasing said phase difference.

9. An arrangement according to claim 8, including means for differentiating said second control voltage to obtain an auxiliary signal and for combining said auxiliary signal with said second control voltage before application thereof to said eddy-current brake means.

10. An arrangement according to claim 3, including means for preventing effectiveness of said second control voltage before said motor means is supplied with said predetermined frequency and operating at said predetermined speed.

11. An arrangement according to claim 4, comprising means for deriving from television signals recorded on said tape vertical synchronizing signals contained therein and for using the same as comparison signals, comparator means for comparing the phase of said comparison signals with the phase of vertical synchronizing signals available from an outside master impulse generator and serving as reference signals, and means cooperating with said comparator means for furnishing said control voltage to said synchronizing means for rendering the latter operative only upon at least approximate phase coincidence between said compared vertical synchronizing signals so as to cause said output voltage of said pulse generator means to stay constantly at said predetermined frequency.

12. An arrangement according to claim 11, including means providing for a predetermined time interval between the moment when said coincidence is achieved and the moment when said pulse generator means is caused to operate at said constant predetermined frequency.

13. An arrangement according to claim 2, wherein said pulse generator means are adapted to deliver a square wave signal, and wherein said circuit means include converter means for converting said square signal into a sinusoidal output voltage applicable to said motor means, with a predetermined phase relationship between said square wave signal and said sinusoidal output voltage.

14. An arrangement according to claim 13, wherein said converter means comprise a first converter stage for converting said square wave signal into a single-phase sinusoidal voltage, a second converter stage for converting said single-phase voltage into a two-phase sinusoidal voltage, and a third converter stage for converting said two-phase voltage into a three-phase sinusoidal voltage applicable to said motor means.

15. An arrangement according to claim 14, wherein said circuit means include starter means comprising a start switch and switch means for interrupting intermittently at least one phase of said two-phase voltage during a period of time immediately subsequent to closing said start switch, so that the start of rotation of the rotor of said motor means is facilitated by an oscillatory motion caused by said action of said switch means.

16. An arrangement according to claim 15, including amplitude limiter means inserted between said first and second converter stages for limiting the amplitude of the voltage applied to said motor means, to a predetermined amount.

17. An arrangement according to claim 3, wherein said means cooperating with said rotatable member comprise a support member mounted for being rotated jointly with said rotatable member, and at least one ferromagnetic element carried by said support member so as to be movable along a circular path, an electromagnetic transducer head being mounted close to said circular path for producing said train of comparison signals in response to the periodical passage of said ferromagnetic element.

References Cited by the Examiner

UNITED STATES PATENTS

| | | | |
|---|---|---|---|
| 2,863,108 | 12/58 | Raffensperger | 318—171 |
| 2,920,263 | 1/60 | Curtis | 322—32 |
| 2,965,708 | 12/60 | Witt | 178—6.6 |
| 2,979,562 | 4/61 | Leyton | 178—6.6 |
| 3,003,025 | 10/61 | Ginsburg et al. | 178—6.6 |

DAVID G. REDINBAUGH, *Primary Examiner.*

ROY LAKE, *Examiner.*